US007072462B2

(12) United States Patent
Smith et al.

(10) Patent No.: US 7,072,462 B2
(45) Date of Patent: Jul. 4, 2006

(54) ESTIMATION OF DSL TELEPHONE LOOP CAPABILITY USING CAZAC SEQUENCE

(75) Inventors: Wesley H. Smith, Raleigh, NC (US); Veda Krishnan, Raleigh, NC (US); Xiao M. Gao, Raleigh, NC (US); Kanna Krishnan, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 10/609,806

(22) Filed: Jun. 30, 2003

(65) Prior Publication Data

US 2004/0264685 A1 Dec. 30, 2004

(51) Int. Cl.
*H04M 9/00* (2006.01)

(52) U.S. Cl. .................. 379/398; 379/399.01; 379/394

(58) Field of Classification Search ................ 379/398, 379/399.01, 394
See application file for complete search history.

(56) References Cited

U.S. PATENT DOCUMENTS 5,473,686 A 12/1995 Virdee .................... 379/406.08
6,091,713 A * 7/2000 Lechleider et al. ...... 379/22.03
6,377,901 B1 4/2002 List et al. .................... 702/119
6,421,443 B1 7/2002 Moore et al. .......... 379/406.01
6,654,463 B1 11/2003 Leonidov et al. ...... 379/406.08
2002/0131583 A1 9/2002 Lu ........................ 379/406.08
2002/0191779 A1* 12/2002 Pham .................... 379/406.08

OTHER PUBLICATIONS

Rentko, Bobbi. "Telcordia DSL Loop Qualification Service (DLQS) for ISP Market—Qualifying end-users transparently for DSL service—White Paper". pp. 1-5. Copyright 2002, Telcordia Technologies, Inc.
Telcordia™ DSL Loop Qualification Service (formerly Sapphyre). Printed from www.telcordia.com, Feb. 3, 2003.

* cited by examiner

*Primary Examiner*—Jefferey F. Harold
(74) *Attorney, Agent, or Firm*—Trop, Pruner & Hu, P.C.

(57) ABSTRACT

A system for determining whether a telephone loop is capable of carrying a Digital Subscriber Line (DSL) signal. A Constant Amplitude Zero Auto Correlation (CAZAC) sequence signal is generated and transmitted through the loop plant to a central office and the received echo signal is processed using second-order statistics. The second-order statistics calculation permits determination of the echo signal amplitude and time between the echo signal and sequence signal. The echo signal amplitude and time may be used to obtain telephone loop characteristics such as loop length.

26 Claims, 14 Drawing Sheets

ESTIMATION OF DSL TELEPHONE LOOP CAPABILITY USING CAZAC SEQUENCE

CROSS-REFERENCE TO RELATED APPLICATIONS

This application relates to the following commonly assigned co-pending applications entitled "Fuzzy Logic Impedance Mismatch Network For DSL Qualification," Ser. No. 10/609,989, filed Jun. 30, 2003 and "Time Domain Reflected Signal Measurement Using Statistical Signal Processing," Ser. No. 10/609,838, filed Jun. 30, 2003, all of which are incorporated by reference herein.

BACKGROUND

This invention relates generally to determining if a telephone loop is capable of carrying Digital Subscriber Line (DSL) loop signals.

Deployment of broadband services on a telephone loop is severely limited by the inherent properties of the copper cable and, in part, because initial deployment of the copper cable was aimed primarily at providing voice services to subscribers. Until the telephone loop cable and plant are upgraded or replaced, as by installation of optical fiber loops, advanced digital signal processing holds great promise today for subscribers who desire broadband services such as high speed internet access, remote Local Area Network (LAN) access and switched digital video. Technological advances have brought about DSL technology at high data rates, e.g., High-rate DSL (HDSL), Asymmetric DSL (ADSL) and Very high-speed DSL (VDSL). For example, using ADSL technology, information signals are modulated by ADSL modems onto copper telephone loops at passband frequencies so that Plain Old Telephone Service (POTS) or another baseband service may be carried on the same pair of copper wires. Using the existing copper telephone loop is extremely cost effective as the installation of new cable and structure along with their associated labor and material costs are avoided.

Deployment of DSL technology is limited by the transmission characteristics of the telephone loop. The transmission characteristics of the telephone loop depend on the length of the copper line, its gauge, the presence of bridged taps, the quality of splitters, the integrity of the shielding, loading coils, impedance mismatches and other loop impairments. Specifically, line loss increases with line length and attenuation increases with increasing frequency and decreases as wire diameter increases. If the telephone loop is too long, then transmission of DSL signals at high data rates from the CO to the subscriber's termination location and vice-versa may not be possible. There are particular points along the telephone loop between the subscriber's termination location and the originating CO where the loop is particularly susceptible to ingress interference. These points include, for example, the location of a bridged tap, the drop wire from the telephone pole to the home, and the wires within the home. At the aforementioned points ingress noise may be coupled into the loop. The presence of other telephone terminals connected to other pairs in the cable also introduces noise into the DSL signal. Furthermore, bridged taps create more loss, distortion, and echo. All these factors serve to limit the data transfer rate at which a subscriber may be connected to a broadband service provider over the telephone loop and are a major cause of connection problems subscribers currently face in making data connections via the public switched telephone network.

Service providers have several options to determine the environment the DSL signal operates in before they commit to service when a subscriber requests DSL service. The service provider may query the outside plant records to determine the loop configuration. Outside plant records more than likely would have been constructed from the original design records. In many cases, the records available are outdated and do not reflect changes that may have occurred in the outside plant as a result of maintenance and service orders. The end result is that the records are usually inaccurate and may not be relied upon to provide information required by the carrier to predict a telephone loop's ability to support DSL service. The approach described above does not provide the telephone loop characteristic information with a degree of accuracy required to confidently predict DSL performance over the loop. As such, before a particular subscriber may utilize DSL technology for his or her broadband services, the broadband service provider has to determine or have determined the viability of deploying DSL to that subscriber. Thus, there is a need for a system and technique that is able to determine whether the telephone loop is capable of carrying a DSL signal at either the subscriber's premises without any intervention or cooperation from the telephone company or Internet Service Provider (ISP) or at the central office (CO) without cooperation from subscribers.

DETAILED DESCRIPTION

Figure 1:
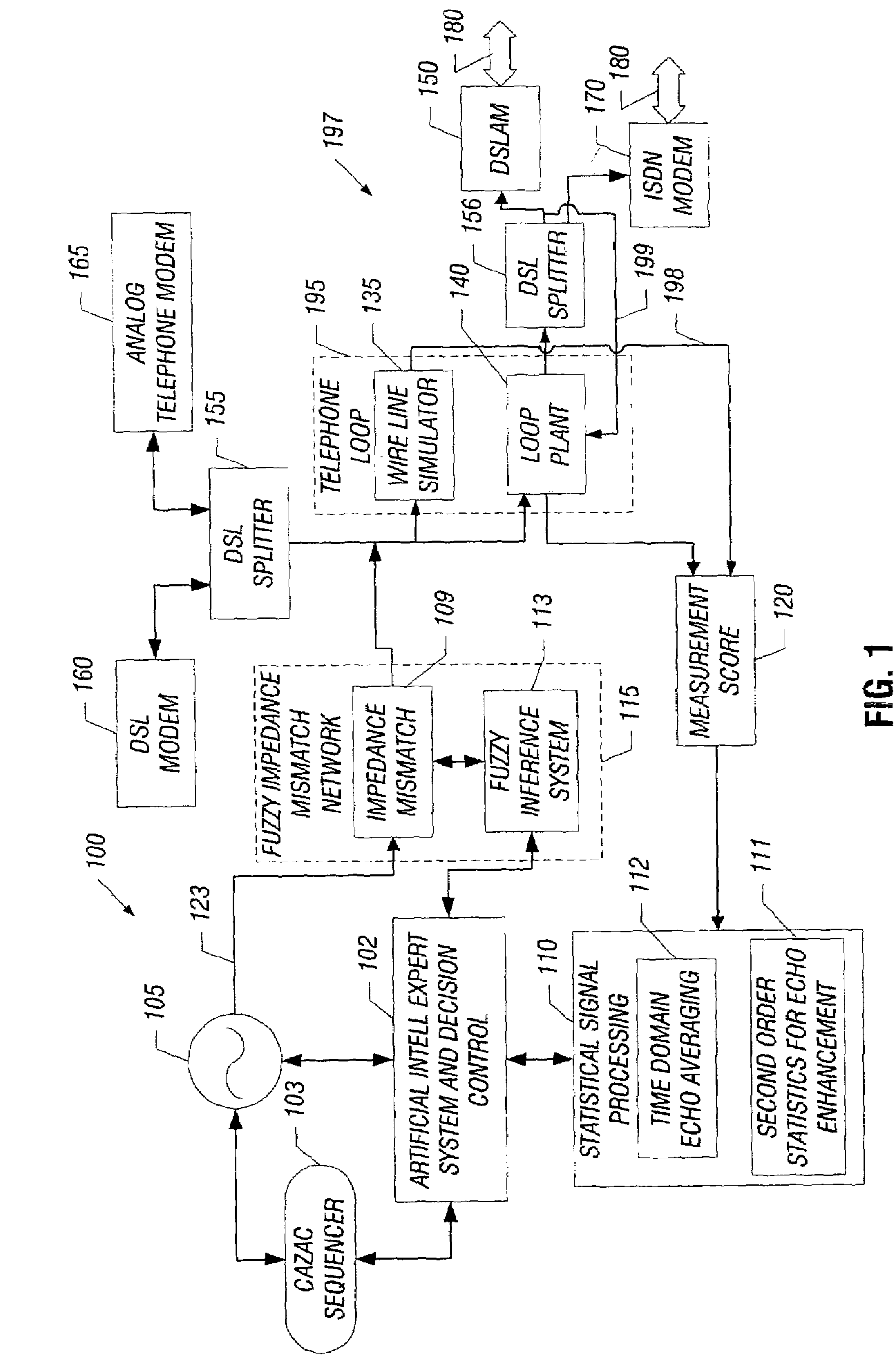
FIG. 1 is a block diagram of a DSL loop qualification system in accordance with an embodiment of the invention.

One way to calculate loop characteristic information is to use the DSL loop qualification system 100 shown in FIG. 1. DSL loop qualification system 100 determines whether the loop plant 140 is capable of carrying a DSL signal. The DSL loop qualification system 100 may include a Constant Amplitude Zero Auto Correlation (CAZAC) sequencer 103 that in conjunction with signal generator 105 generates CAZAC sequence signals to fuzzy impedance mismatch network 115. CAZAC sequencer 103 and signal generator 105 generate CAZAC sequence signals a(n) for transmission to the telephone loop 195 and CO 197. The returned signals received by DSL qualification system 100 include echoes of the CAZAC sequence signals and noise and distortion generated from the various sources described above in the loop plant 140. Signal generator 105 may generate non-CAZAC impulse sequence signals for verification purposes to determine if the telephone loop 195 is capable of carrying DSL signals. In another embodiment of the invention, CAZAC sequencer 103 and signal generator 105 may be combined into one unit capable of only generating CAZAC sequence signals. Artificial Intelligence Expert System and Decision (AIESD) controller 102 controls operation of the CAZAC sequencer 103 and signal generator 105 for creating CAZAC sequence signals. A CAZAC sequence a(n) of length L samples is defined as:

$$a(n)=Ae^{j\alpha_0 p l(n)},\ n=0,1,2\ \ldots\ ,L-1 \qquad \text{Equation 1}$$

where A is a constant value of the signal, $\alpha_0=2\pi/N$ and N is an integer representing the number of phases. The value of N is chosen such that $N=\sqrt{L}$. The element l(n) is given by concatenating the rows of a matrix. The CAZAC sequencer 105 in one embodiment may generate the periodic impulse sequence $e^{j\alpha_0 p l(n)}$ including CAZAC values l(n) and signal generator 105 may generate the constant value A. For a minimum phase CAZAC sequence a(n) that is generated by CAZAC sequencer 103, p=1.

The DSL loop qualification system 100 may also include statistical signal processing 110 for determining the amplitude and time index of the received signals that are echoes of CAZAC sequence signals transmitted to the loop plant 140 and reflected back as echo signals to statistical signal processing 110. Once the amplitude and time index or pulse spacing of the echo signal is known, other loop characteristics such as telephone loop length may be determined. Statistical signal processing 110 may be used in some embodiments to increase the amplitude of the echoes to facilitate their detection over noise and distortion. For example, statistical signal processing 110 may substantially maximize the amplitude of those signals in one embodiment.

Figure 2:
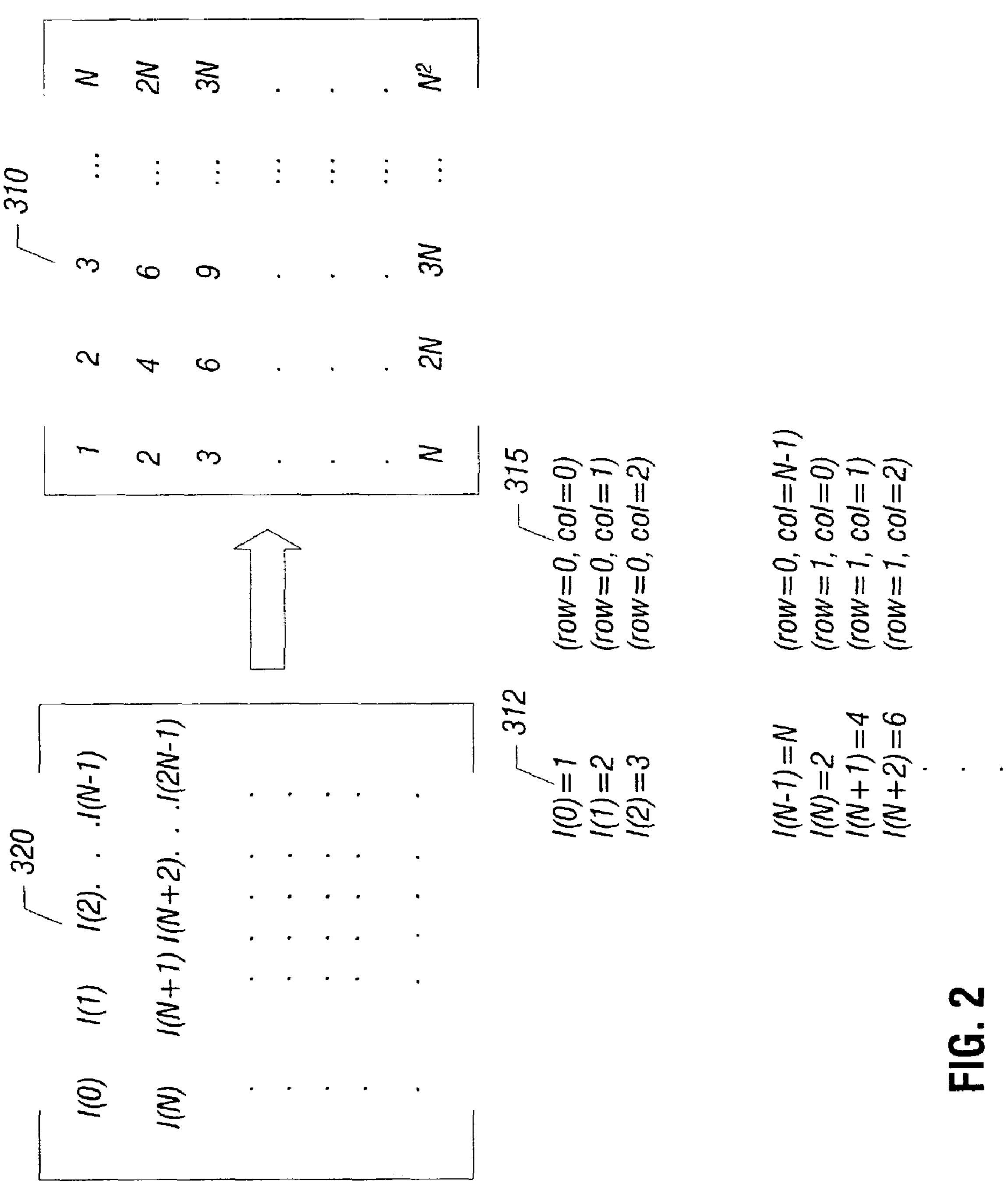
FIG. 2 is a depiction of a matrix of elements used to calculate sequence signals in accordance with an embodiment of the invention.

Turning now to FIG. 2, for a CAZAC sequence of L samples, an N-by-N value matrix 310 is generated with $N=\sqrt{L}$. Each value of the matrix 310 corresponds to an element l(n), n=0,1,2, . . . L−1 320. Values of l(n) are determined by concatenating the rows of matrix 310. Thus, as shown in 312 and 315 l(0)=1 corresponding to (row=0, column=0) of matrix 310, l(2)=3 corresponding to (row=0, column=2), l(N)=2 corresponding to (row=1, column=0), l(N+2)=6 corresponding to (row=1, column=2), etc . . . .

An example of a CAZAC sequence a(n) 330 of L=4 samples is shown below.

FOR $\underline{N=2}$ $$\begin{bmatrix} 1 & 2 \\ 2 & 4 \end{bmatrix}$$

$$\begin{aligned} l(0)&=1 \quad a(0)=e^{j\pi}=\mathrm{COS}\pi+j\sin\pi=-1 \qquad \text{Equation 2}\\ l(1)&=2 \quad a(1)=e^{j2\pi}=\mathrm{COS}2\pi+j\sin2\pi=1\\ l(2)&=2 \quad a(2)=e^{j3\pi}=\mathrm{COS}2\pi+j\sin2\pi=1\\ l(3)&=4 \quad a(3)=e^{j4\pi}=\mathrm{COS}4\pi+j\sin4\pi=1 \end{aligned}$$

$$L=4,\ \alpha_0=\pi,\ \rho=1,\ A=1$$

The value of $\alpha_0=\pi$ since $N=\sqrt{4}=2$ and $\alpha_0=2\pi/2=\pi$. The matrix of l(n) elements corresponding to N=2 has four values l(0)=1, l(1)=2, l(2)=2, and l(3)=4. For a minimum phase CAZAC sequence a(n), p=1. In one embodiment, if signal generator 105 generates the constant value A=1, then using equation 1 results in the CAZAC sequence signal values of a(0)=−1, a(1)=1, a(2)=1, and a(3)=1. The CAZAC sequence signal values a(0) . . . a(3) are calculated using equation 1 with $e^{j\alpha_0 p l(n)}=\cos(\alpha_0 pl(n))+j\sin(\alpha_0 pl(n))$ and the values of $\alpha_0$, p, and l(n) as given above.

Multiplication of the CAZAC sequence signal a(n) with a(n+k), the CAZAC sequence signal shifted an amount k along the x-axis, will generate a superimposed signal that may be larger or smaller in amplitude based on the original amplitude values of a(n). The expected value E[a(n)a(n+k)] is also known as the second-order statistics $R_a(k)$, or auto correlation $R_a(k)$, of the CAZAC sequence signals a(n):

$$R_a(k)=E[a(n)a(n+k)] \qquad \text{Equation 3}$$

$R_a(k)$ may be considered as a measure of the similarity of the waveform a(n) and the waveform a(n+k). The signal a(n) containing the original CAZAC sequence signal would have a large similarity to the shifted a(n+k) signal because of its periodic nature.

Second-order statistics $R_b(k)$ of the received CAZAC sequence signal echo b(n) may be defined as:

$$R_b(k)=E[b(n)b(n+k)] \qquad \text{Equation 4}$$

The second-order statistics $R_b(k)$ is also known as the auto correlation function of the received CAZAC sequence signal echo b(n). As will be discussed in greater detail below, $R_b(k)$ may be considered as a measure of the similarity of the waveform b(n) and the waveform b(n+k), the received CAZAC sequence signal echo shifted an amount k along the x-axis.

Figure 3:
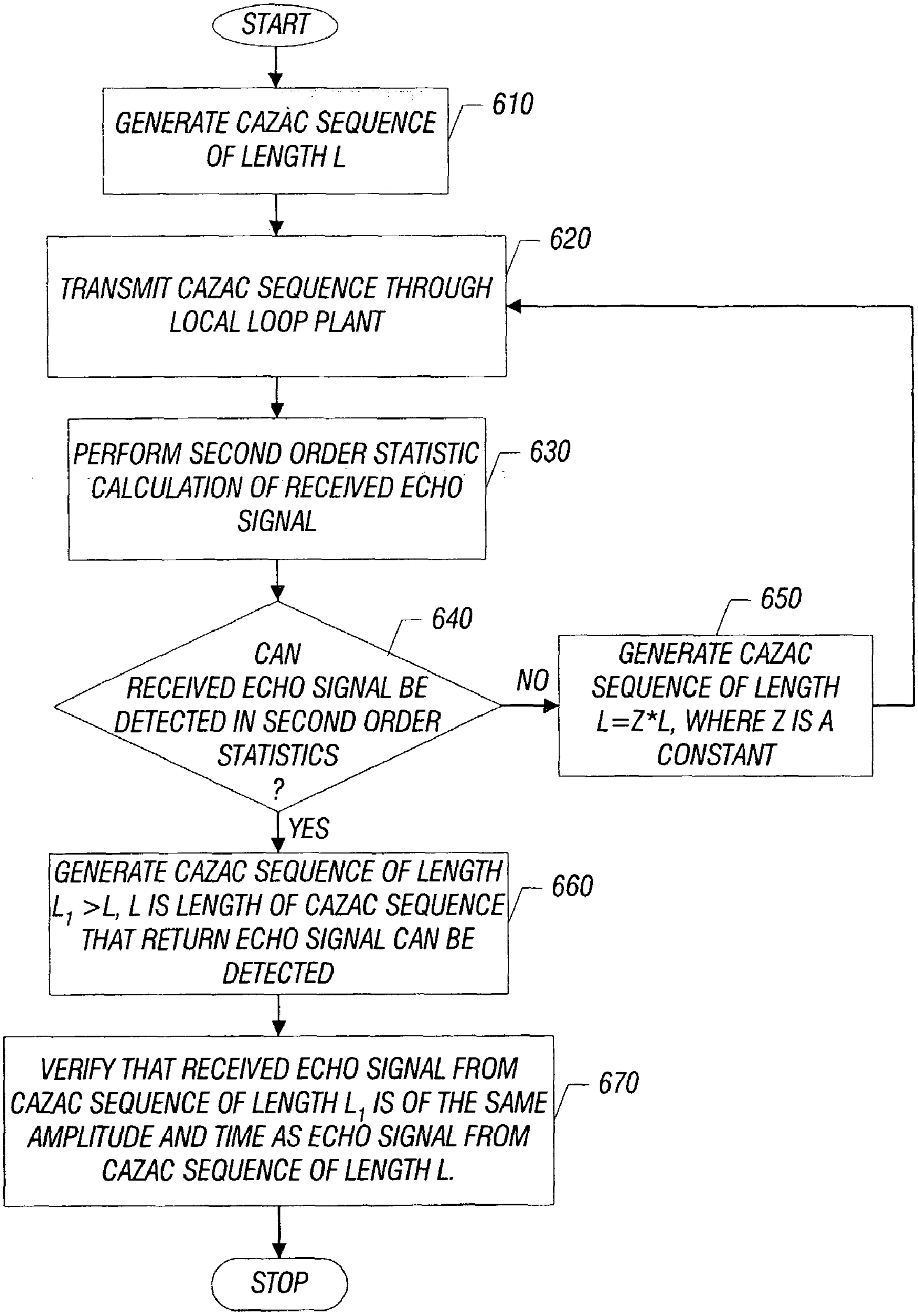
FIG. 3 is a flow chart for detecting echo signals in accordance with an embodiment of the invention.
Figure 4:
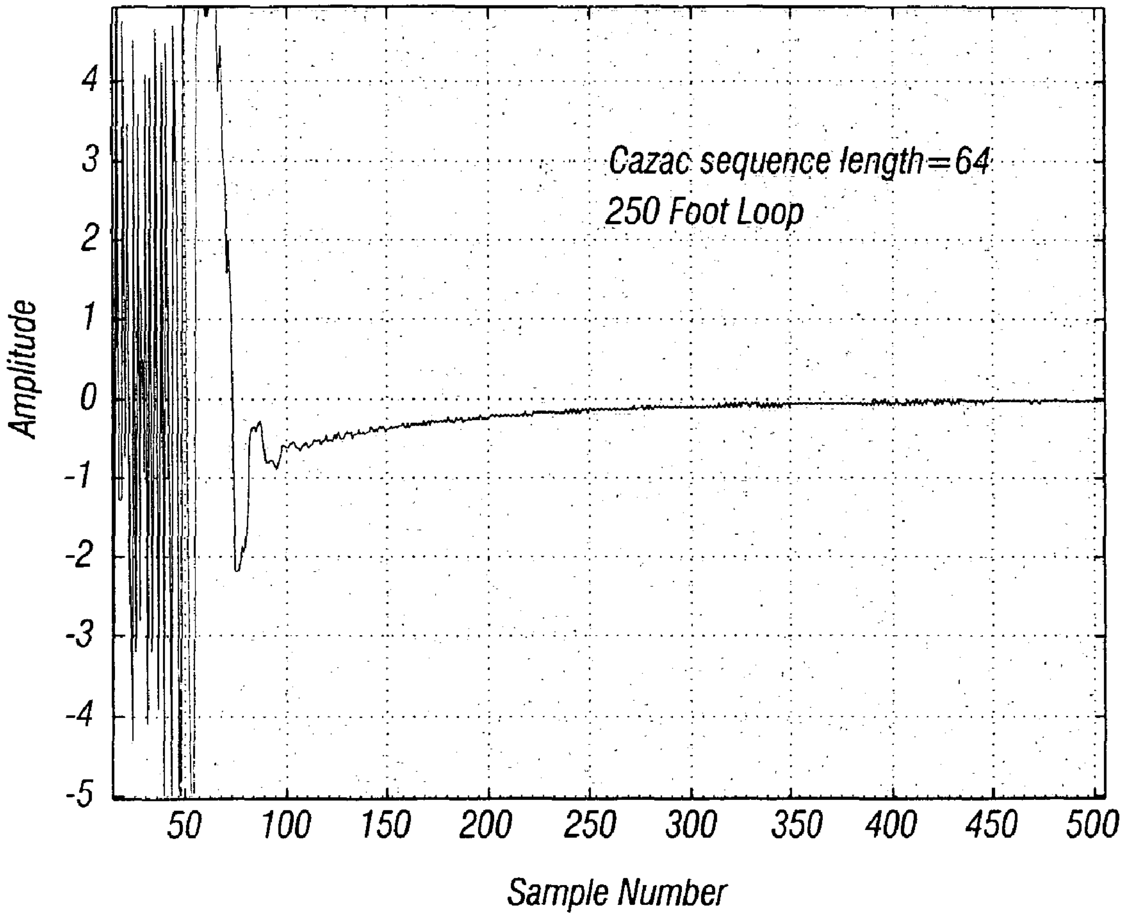
FIG. 4 is a graph of amplitude versus sample number using generated data in accordance with an embodiment of the invention.
Figure 5:
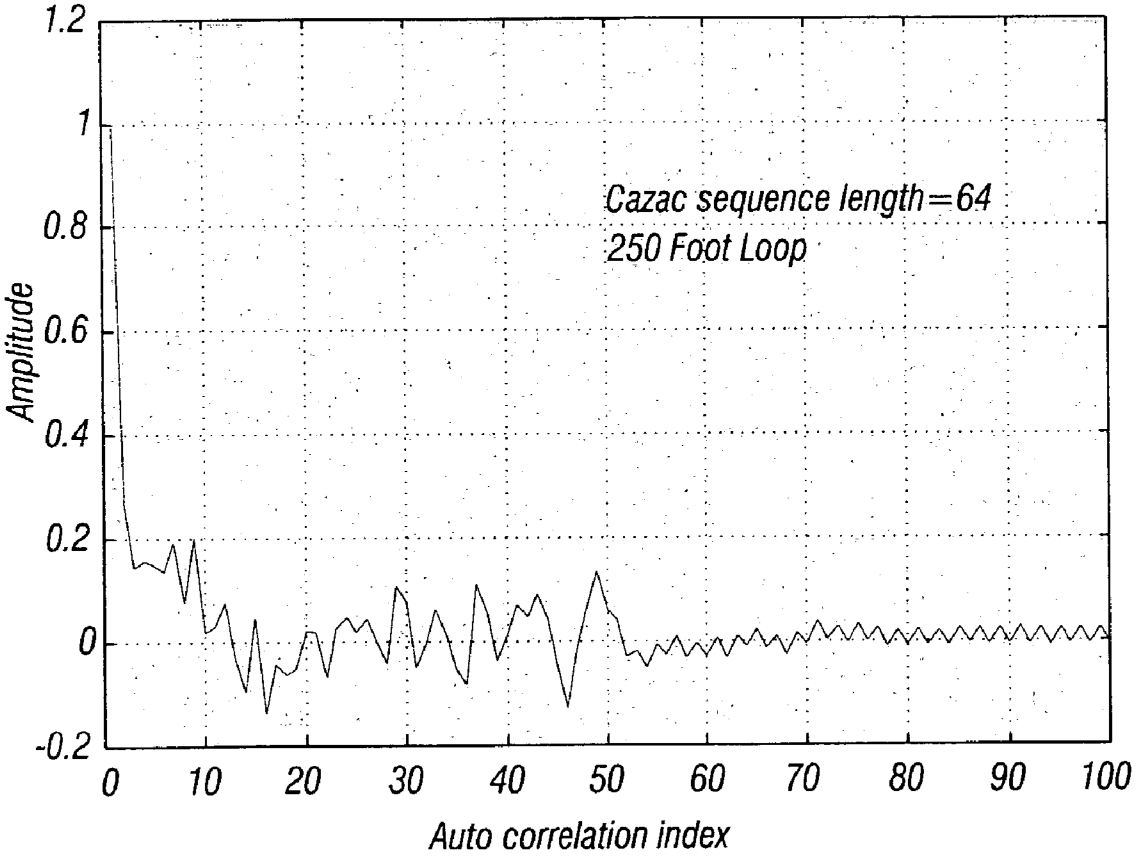
FIG. 5 is a graph of amplitude versus auto correlation index for generated data in accordance with an embodiment of the invention.
Figure 6:
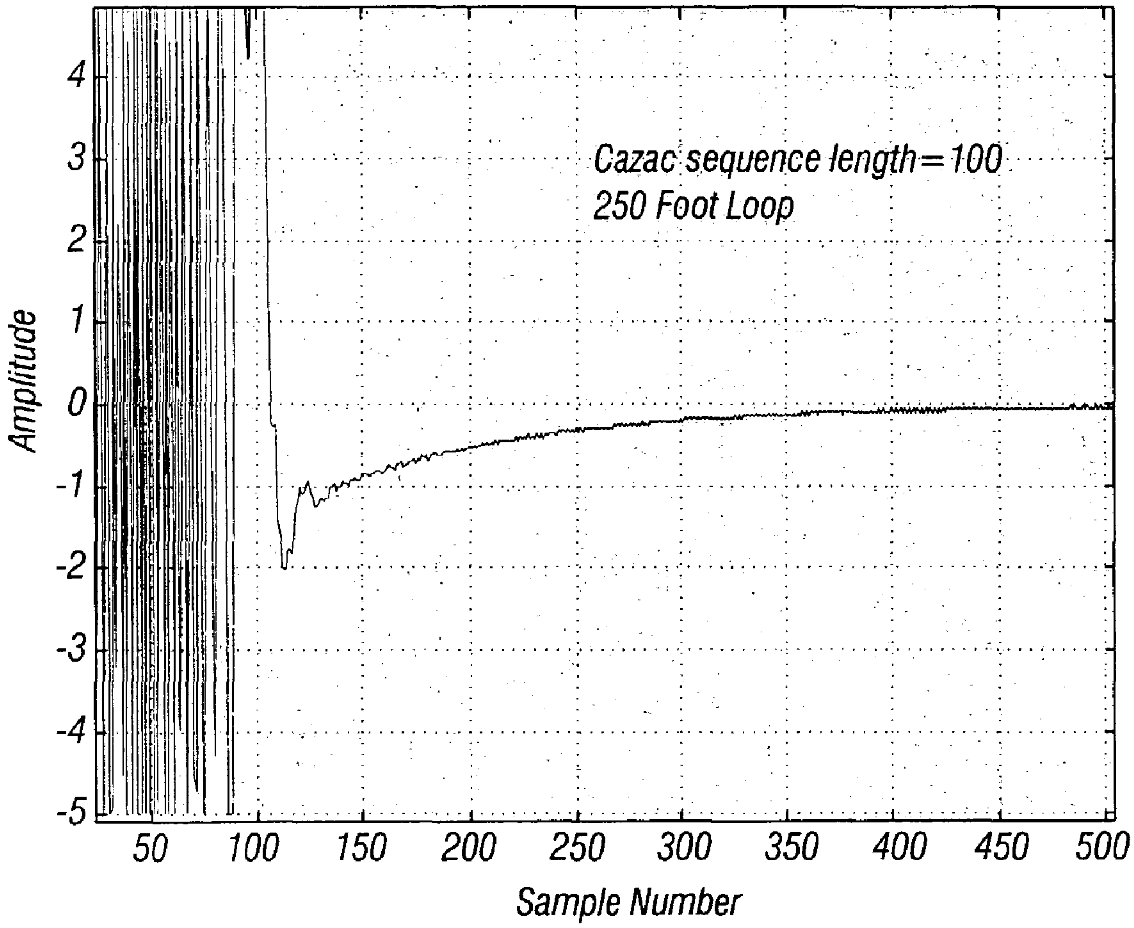
FIG. 6 is a graph of amplitude versus sample number using generated data in accordance with an embodiment of the invention.
Figure 7:
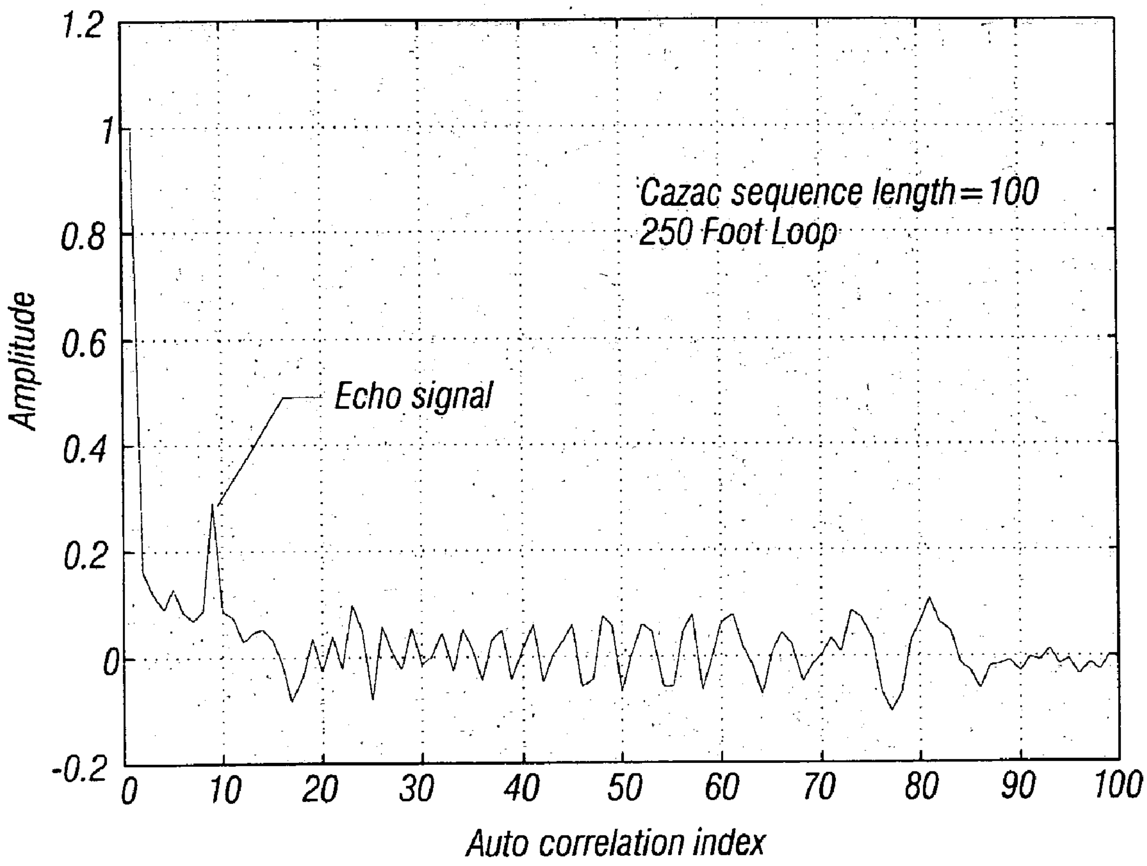
FIG. 7 is a graph of amplitude versus auto correlation index for generated data in accordance with an embodiment of the invention.
Figure 8:
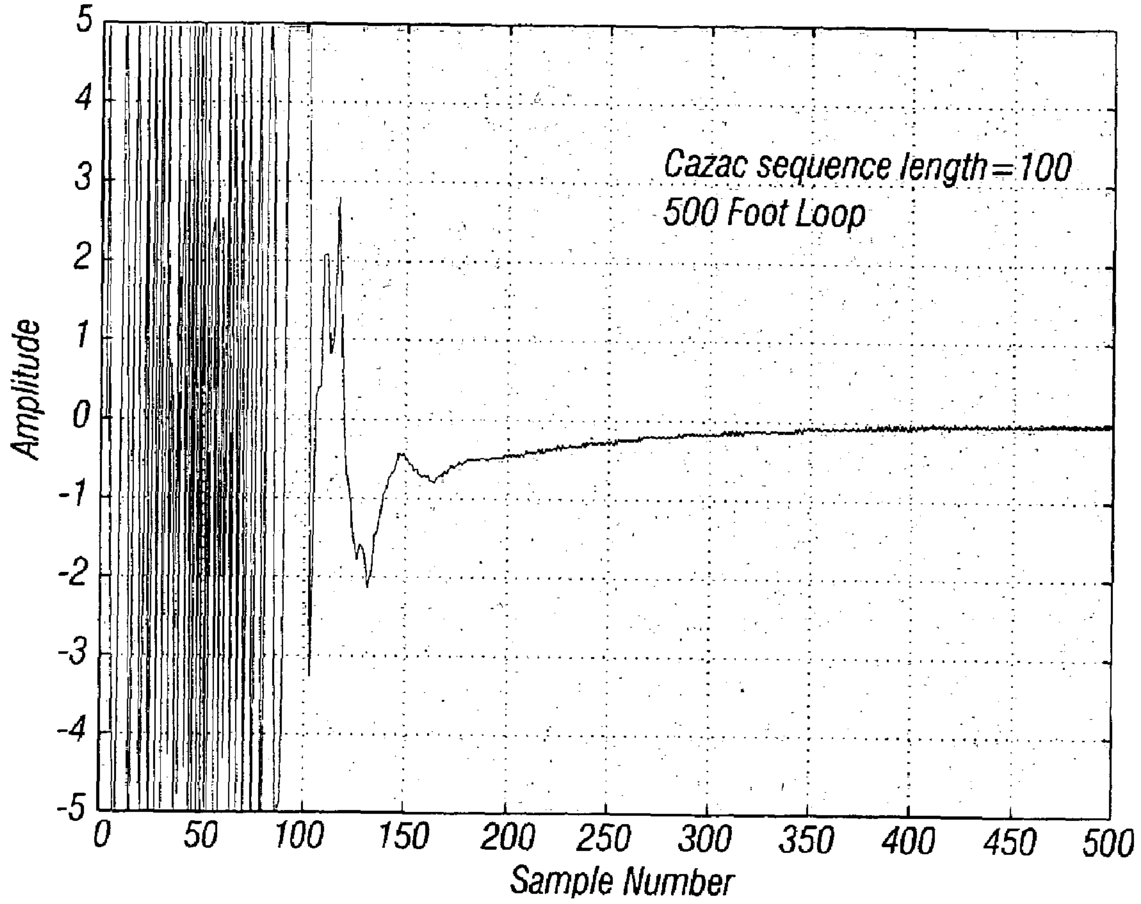
FIG. 8 is a graph of amplitude versus sample number using generated data in accordance with an embodiment of the invention.
Figure 9:
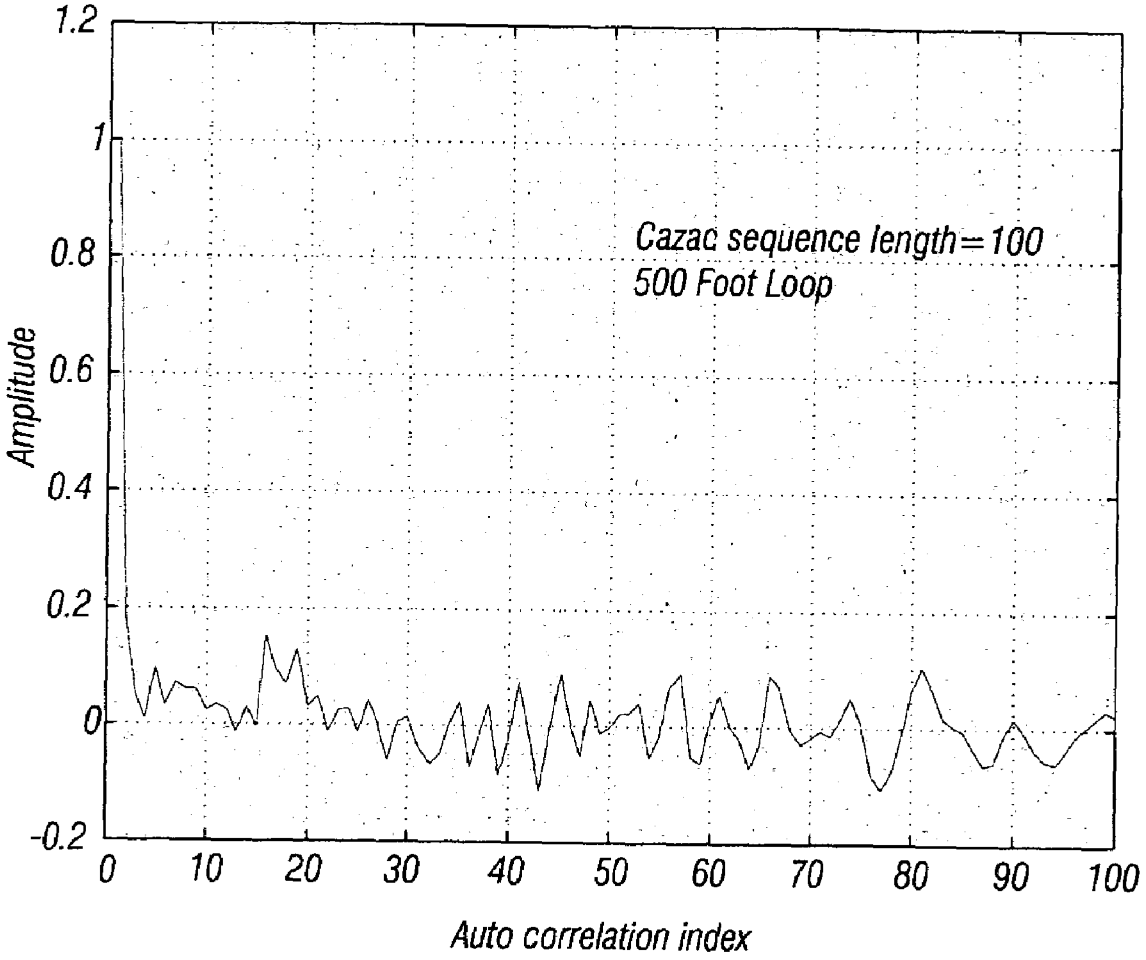
FIG. 9 is a graph of amplitude versus auto correlation index for generated data in accordance with an embodiment of the invention.
Figure 10:
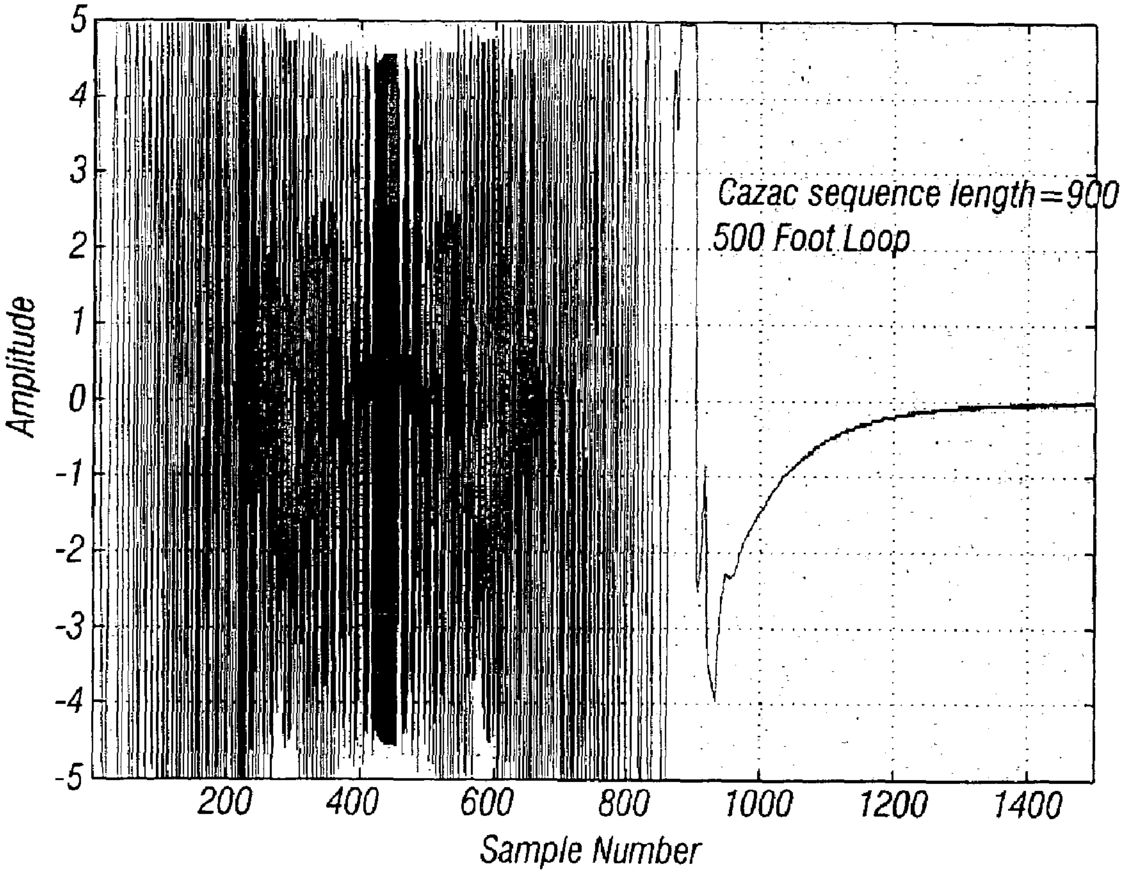
FIG. 10 is a graph of amplitude versus sample number using generated data in accordance with an embodiment of the invention.
Figure 11:
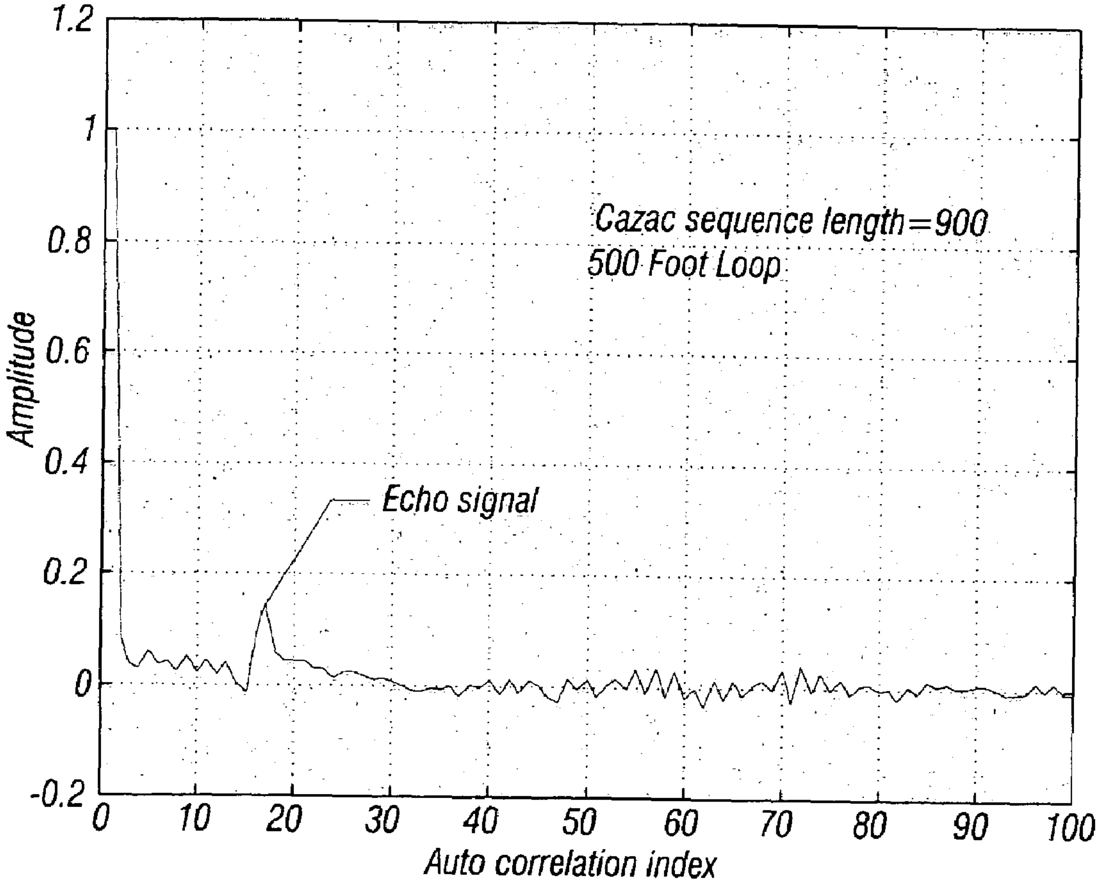
FIG. 11 is a graph of amplitude versus auto correlation index for generated data in accordance with an embodiment of the invention.

Referring now to FIG. 3, a technique for detecting echo signals from generated CAZAC sequence signals is shown. The technique shown in FIG. 3 may be implemented, in one embodiment, in measurement scope 120 or in another embodiment in AIESD controller 102 as two examples. A CAZAC sequence signal of length L samples is generated in block 610. Next, in block 620, the CAZAC sequence signal is transmit thru loop plant 140 to CO 197. The signal received at the measurement scope 120 from the loop plant 140 includes the original CAZAC sequence signal, the echo signal of the CAZAC sequence and noise. The noise may be reduced by use of digital filtering in measurement scope 120 and by the statistical signal processing techniques 110 described below. In FIGS. 4–13, the generated data are shown without noise to simplify visual presentation. Second-order statistics calculation $R_b(k)$ of the received CAZAC sequence signal and its echo is performed in block 630 using Equation 4 described above. If the echo signal can not be detected from the second-order statistics calculation plot of amplitude versus auto correlation index in block 640, a longer CAZAC sequence signal is generated, as shown in block 650. FIG. 4 is a plot of amplitude versus sample number for CAZAC sequence signal of L=64 samples and its received echo signal for a 250 foot loop plant. The echo signal can not be determined in FIG. 4 or in FIG. 5, the second-order statistics calculation $R_b(k)$ of the data in FIG. 4. Increasing the length of the CAZAC sequence signal to L=100 for a 250 foot loop plant, the echo signal may now be obtained as shown in FIGS. 6 and 7. FIG. 6 is a plot of the amplitude versus sample number for the CAZAC sequence signal of length L=100 and its received echo signal. FIG. 7 is a plot of the amplitude versus auto correlation index of the CAZAC sequence signal and received echo signal shown in FIG. 6. The echo signal can clearly be seen in FIG. 7 that is the plot of second-order statistics calculation $R_b(k)$ of the data in FIG. 6. For determination of the echo signal for a 500 foot loop plant, the echo signal becomes difficult to detect for a CAZAC sequence signal of length L=100 as shown in FIGS. 8 and 9. FIG. 8 is a plot of amplitude versus sample number for CAZAC sequence signal of length L=100 and its received echo signal for a 500 foot loop plant. FIG. 9 is a plot of the amplitude versus auto correlation index of the CAZAC sequence signal and received echo signal shown in FIG. 8. The echo signal can not be obtained in FIG. 8 or in FIG. 9, the second-order statistics calculation $R_b(k)$ of the data in FIG. 8. To obtain the echo signal for a 500 foot loop plant, the CAZAC sequence signal length has to be increased as shown in FIGS. 10 and 11. FIG. 10 is a plot of amplitude versus sample number for CAZAC sequence signal of length L=900 and its received echo signal for a 500 foot loop plant. The received echo signal is hard to obtain because it is buried inside the CAZAC sequence signal. FIG. 11 is a plot of the amplitude versus auto correlation index of the CAZAC sequence signal and received echo signal shown in FIG. 10. The second order statistics calculation $R_b(k)$ shown in FIG. 11 of the data in FIG. 10 allows determination of the echo signal even if the echo signal is buried inside the CAZAC sequence signal.

Figure 12:
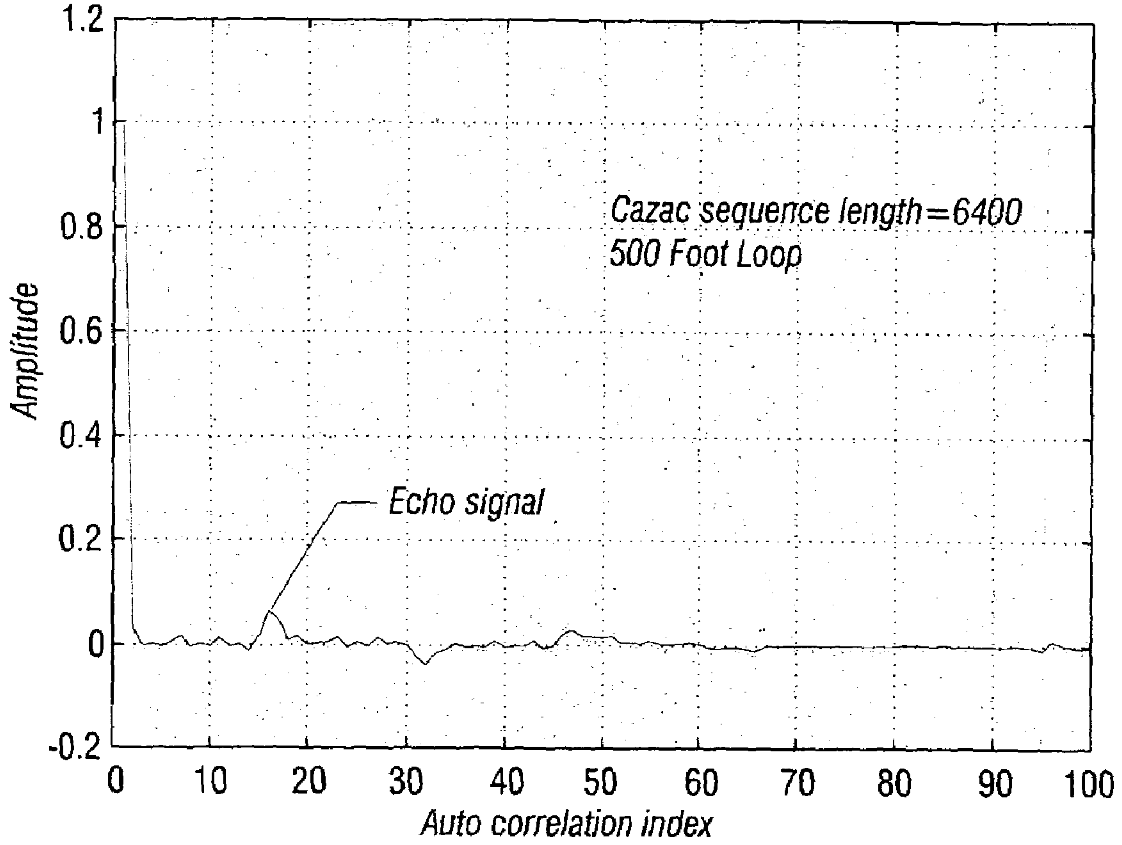
FIG. 12 is a graph of amplitude versus auto correlation index for generated data in accordance with an embodiment of the invention.
Figure 13:
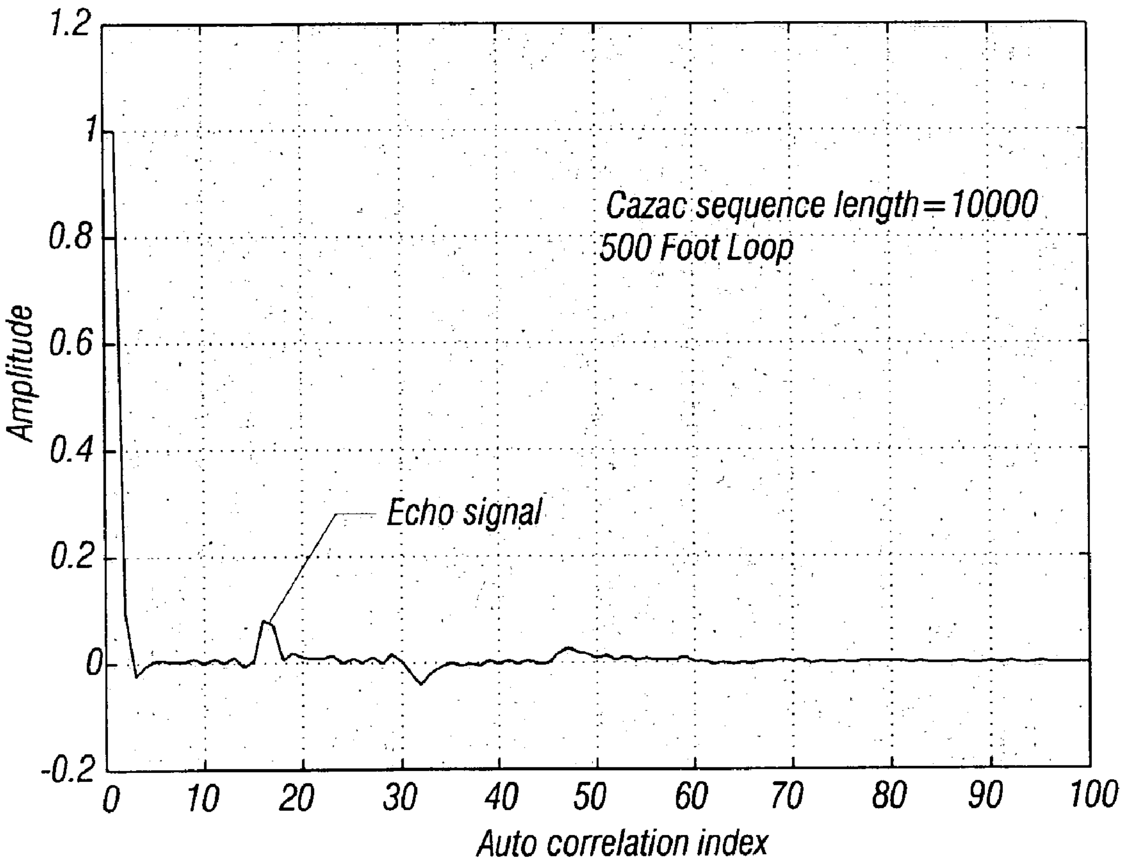
FIG. 13 is a graph of amplitude versus auto correlation index for generated data in accordance with an embodiment of the invention.

Returning to FIG. 3, in one embodiment of the invention, once the received echo signal can be detected from the second order statistics calculation, verification of the amplitude and time of the echo signal may be performed as shown in blocks 660 and 670. In another embodiment of the invention, no verification may be performed to reduce cost of testing. In block 660, a CAZAC sequence signal of length $L_1$>L is generated and transmitted to the loop plant 140. Second order statistics calculation $R_b(k)$ of the CAZAC sequence signal of length $L_1$ and received echo signal is performed to obtain the time and amplitude of the echo signal. These parameters are verified against the time and amplitude calculations of the echo signal from CAZAC sequence signal of length L in block 670. If the time and amplitude values do not match within a tolerance, the test for obtaining the echo signal amplitude and time is restarted in block 610 in one embodiment. FIGS. 12 and 13 show the plots used for verification of the echo signal amplitude and time for a 500 foot loop plant. FIG. 12 is a plot of amplitude versus auto correlation index of a CAZAC sequence signal of length $L_1$=6400 and its received echo signal. FIG. 13 is a plot of amplitude versus auto correlation index of a CAZAC sequence signal of length $L_1$=10000 and its received echo signal. Comparing the amplitude and time occurrence of the echo signal in FIGS. 11, 12, and 13, these values are approximately the same within a certain tolerance.

Figure 14:
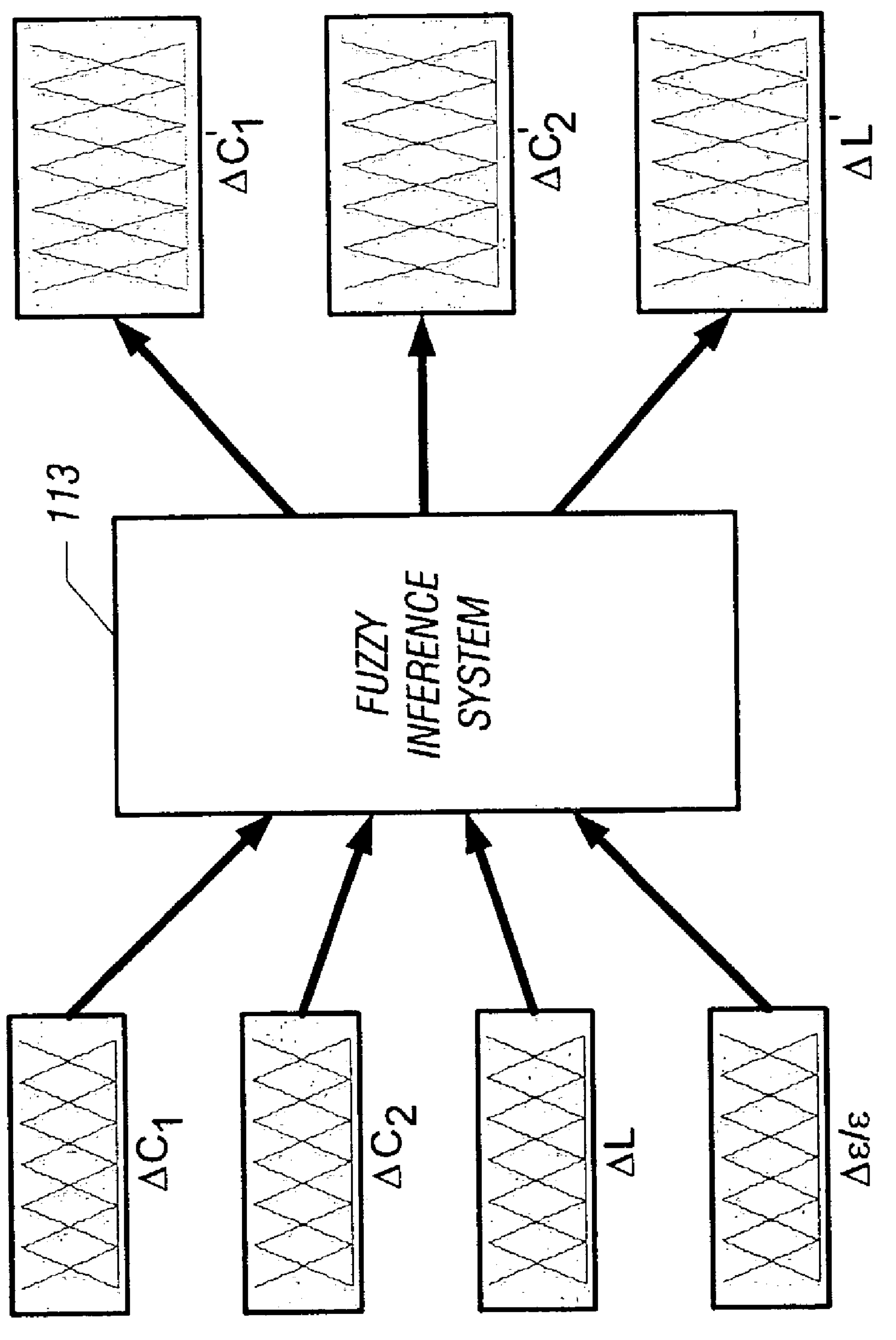
FIG. 14 is a depiction of the fuzzy inference system of FIG. 1 in one embodiment of the present invention.

Returning to FIGS. 1 and 14, DSL loop qualification system 100 includes a fuzzy impedance mismatch network 115 that receives the output from signal generator 105. Fuzzy impedance mismatch network 115 may include impedance mismatch hardware 109 and a fuzzy inference system controller 113 in one embodiment. Impedance mismatch hardware 109 includes two adjustable capacitors $C_1$ and $C_2$, and one adjustable inductor L. Fuzzy inference system controller 113 adjusts the values of the impedance mismatch network hardware to increase or, in some embodiments, to maximize the CAZAC sequence signals. The fuzzy inference system 113 is controlled by AIESD controller 102. AIESD controller 102 also controls the CAZAC sequencer 103, signal generator 105 and the statistical signal processing controller 110. In one embodiment, AIESD controller 102 receives the generated CAZAC sequence signals from signal generator 105 and echo signals from statistical signal processing controller 110. The AIESD controller 102 then calculates the change in echo value versus the echo value ($\Delta\epsilon/\epsilon$) that is output to the fuzzy inference system 113. As shown in FIG. 14, fuzzy inference system 113 receives as inputs ($\Delta\epsilon/\epsilon$) from AIESD controller 102. The fuzzy inference system 113 outputs to the impedance mismatch network 109 a new change in capacitance $C'_1$ ($\Delta C'_1$), new change in capacitance $C'_2$ ($\Delta C'_2$), and new change in inductance L' ($\Delta L'$) as shown in FIG. 14. The fuzzy inference system 113 also receives as inputs $\Delta C_1$, $\Delta C_2$, and $\Delta L$ that are the previous iteration outputs of $\Delta C'_1$, $\Delta C'_2$, and $\Delta L'$, respectively, of fuzzy inference system 113. Thus, the output values $\Delta C'_1$, $\Delta C'_2$, and $\Delta L'$ become the input values $\Delta C_1$, $\Delta C_2$, and $\Delta L$, respectively, for the fuzzy inference system 113 in the next iteration of maximization of the echo signal. Capacitors C1, C2 and inductor L in impedance mismatch network 109 are adjusted based on the values of $\Delta C'_1$, $\Delta C'_2$, and $\Delta L'$.

Operation of the fuzzy inference system 113, in one embodiment includes: (a) translation of a crisp input value into a fuzzy output value known as fuzzification using fuzzy membership functions, (b) rule evaluation, where the fuzzy output values are computed, and (c) translation of a fuzzy output to a crisp value known as defuzzification. The fuzzy inference system 113 includes a range of values for its input and output variables. Thus, for example, $\Delta C_1$ varies over the range −20 μF to 20 μF and $\Delta L$ varies over the range −10 μH to 10 μH. Labels for the triangular shaped fuzzy membership functions for each of the input and output values of the fuzzy inference system are:

NL negative large
NM negative medium
NS negative small
NSC no significant change
PS positive small
PM positive medium
PL positive large The fuzzy inference system 113 for each of the input and output variables uses a set of rules in one embodiment to maximize the echo value:

IF $\Delta C_1$ is NL and ($\Delta\epsilon/\epsilon$) is NL then $\Delta C'_1$ is NM Rule 1
IF $\Delta C_1$ is NM and ($\Delta\epsilon/\epsilon$) is NL then $\Delta C'_1$ is NS Rule 2
. . .
IF $\Delta C_1$ is NL and ($\Delta\epsilon/\epsilon$) is NM then $\Delta C'_1$ is NS Rule A+1
IF $\Delta C_1$ is NL and ($\Delta\epsilon/\epsilon$) is NS then $\Delta C'_1$ is NSC Rule A+2
. . .

IF $\Delta C_1$ is NM and $(\Delta\epsilon/\epsilon)$ is NM then $\Delta C'_1$ is NS Rule B+1

IF $\Delta C_1$ is NM and $(\Delta\epsilon/\epsilon)$ is NS then $\Delta C'_1$ is NSC Rule B+2

. . .

IF $\Delta C_2$ is NL and $(\Delta\epsilon/\epsilon)$ is NL then $\Delta C'_2$ is NM IF $\Delta C_2$ is NM and $(\Delta\epsilon/\epsilon)$ is NL then $\Delta C'_2$ is NS

. . .

IF $\Delta C_2$ is NL and $(\Delta\epsilon/\epsilon)$ is NM then $\Delta C'_2$ is NS IF $\Delta C_2$ is NL and $(\Delta\epsilon/\epsilon)$ is NS then $\Delta C'_2$ is NSC

. . .

IF $\Delta L$ is NL and $(\Delta\epsilon/\epsilon)$ is NL then $\Delta L'$ is NM IF $\Delta L$ is NM and $(\Delta\epsilon/\epsilon)$ is NL then $\Delta L'$ is NS

. . .

IF $\Delta L$ is NL and $(\Delta\epsilon/\epsilon)$ is NM then $\Delta L'$ is NS IF $\Delta L$ is NL and $(\Delta\epsilon/\epsilon)$ is NS then $\Delta L'$ is NSC

. . .

Thus, each label is assigned to each fuzzy input $\Delta C_1$, $\Delta C_2$, $\Delta L$, and $(\Delta\epsilon/\epsilon)$ in a rule and the appropriate fuzzy output generated. The fuzzy inputs $\Delta C_1$, $\Delta C_2$, $\Delta L$, and $(\Delta\epsilon/\epsilon)$ go through the fuzzy inference system and defuzzification technique to generate new crisp outputs $\Delta C'_1$, $\Delta C'_2$, and $\Delta L'$ to adjust the impedance of the mismatch network.

Referring again to FIG. 1, DSL loop qualification system 100 also may contain a measurement scope 120 to receive echo signals over the return paths from either wire line simulator 135 or loop plant 140. The measurement scope 120 may be a microprocessor based instrument such as an oscilloscope including an analog-to-digital (A/D) converter and application software to detect, capture and preprocess the received echo signal. In another embodiment, measurement scope 120 may be included in DSL modem 160 that is capable of determining whether the telephone loop may carry a DSL signal. The measurement scope outputs the echo signal to statistical signal processing controller 110. Statistical signal processing controller 110 processes the echo signals using time domain echo averaging 112 and second-order statistics for echo enhancement 111 to reduce or, in some cases, eliminate noise and permit improved visualization of the echo signal and original CAZAC sequence signal. DSL splitter 155 separates the data signals from the voice signals transmit over the copper lines of the telephone loop 195.

In one embodiment of the invention shown in FIG. 1, telephone loop 195 includes a wireline simulator 135 and loop plant 140. Wireline simulator 135 provides loop plant 140 profile data and may be used to assist in line identification. In one embodiment, wireline simulator 135 may be disconnected once the loop plant profile data has been obtained and measurement scope 120 is connected to loop plant 140. In one embodiment, loop plant 140 is the path over which the DSL signal travels to the CO 197 and returns from the CO through return path 199 to measurement scope 120. The DSL signal is affected by various characteristics of the loop plant including copper cable length, gauge, presence of bridged taps, quality of splices, integrity of shielding, loading coils, impedance mismatches and interference. After traveling through loop plant 140, the DSL signal is transmitted to DSL splitter 156 in CO 197 that separates DSL data signals and voice signals that may have overlapped during transmission through loop plant 140. The DSL signal may then be transmitted to a DSLAM 150 or ISDN modem 170 for high speed transmission 180 to the ISP's network. If the DSL loop qualification system 100 has determined that the telephone loop is capable of carrying the DSL signal, DSL modem 160 and analog telephone modem 165, as shown in FIG. 1, in one embodiment may verify the results of the DSL loop qualification system. Verification may occur by sending an actual DSL signal as well as an analog modem signal over the telephone loop 195.

Time domain echo averaging technique 112 in statistical signal processing controller 110 may be used independently or to assist the CAZAC technique described above. In the time domain echo averaging technique 112, a sequence of pulse signals with each pulse of period T is generated. The echo signal and accompanying pulse signal are separated into several groups for estimation of the time delay between the pulse signal and echo signals. In one embodiment, the time domain echo averaging technique 112 proceeds as follows:

1. Generate pulse sequence signal with each period T having NT samples. The signal width is $P_{width}$.
2. Search c(n), the original pulse sequence signal and echo signals with noise, and find the maximum value $c_{max}$ and its corresponding index $I_{max}$.
3. Using the interval $\Delta$ that is provided by AIESD, do a bi-directional search within $p_{width}$ from location $I_{max}$ to find the number of $C_\Delta$ that $C_\Delta \epsilon [C_{max}-\Delta, C_{max}]$. Let $I_{low}$ be the lowest index of $C_\Delta$ and $I_{high}$ the highest index. Find the signal center index by using $$I_{mid} = \left[\frac{I_{low} + I_{high}}{2}\right].$$

4. Starting from $I_{mid}$ as a reference index, divide the whole c(n) into $N_{total}$ subgroups $c^{(i)}(n)$, n=1,2, . . . , $N_T$ and i=1, 2, . . . , $N_{total}$. Align the subgroup in ascending order in index.
5. Average the $N_{total}$ subgroups using $$\overline{c(n)} = \frac{\sum_{i=1}^{N_{total}} c^{(i)}(n)}{N_{total}},\ n = 1, 2, \ldots N_T.$$

Use $\overline{c(n)}$ to estimate the time interval between the pulse sequence signal and its echo.

The time domain echo averaging technique in one embodiment may be implemented as software executing on statistical signal processing controller 110. In another embodiment, the time domain echo averaging technique may be implemented for higher performance using digital and analog circuits.

An example of the use of time domain echo averaging technique 112 as described above is presented. A pulse sequence signal c(n) with period T and width $P_{width}$ is received from the telephone loop 195. The pulse sequence signal, for this example, includes three complete periods each of length T. Each period is sampled $N_T$ times. The pulse sequence signal c(n) includes the original signal generated by signal generator 105 and echo signals with additive noise. In one embodiment, a maximum value $c_{max}$ is determined by searching c(n) within the interval $P_{width}$ for a single period. The corresponding index $I_{max}$ of maximum value $c_{max}$ is also determined in one embodiment. In general, noise makes the echo signal almost invisible and difficult to detect.

AIESD controller 102 calculates an interval $\Delta$. To determine $\Delta$, AIESD controller 102 calculates the variance $\sigma^2$ of the echo signal samples with noise. The variance $\sigma^2$ of the echo samples with noise is a measure of how severe the noise is. In one embodiment, the variance $\sigma^2$ is determined by transforming the echo signal using a Fourier transform from the time domain into the frequency domain to calculate the noise floor. The noise floor from the transformed echo signal may be used to calculate the variance $\sigma^2$. In another embodiment, the variance $\sigma^2$ may be estimated by determining the variance of samples within $P_{width}$, i.e. computed as the average squared deviation of each sample amplitude from the mean of all sample amplitudes. Thus, for example for three samples of amplitude 0. 1, 0.2 and 0.3, the mean is 0.2 ((0.1+0.2+0.3)/3=0.2) and the variance $\sigma^2$ is:

$$\sigma^2=((0.1-0.2)^2+(0.2-0.2)^2+(0.3-0.2)^2)/3=0.00667$$

AIESD controller 102 estimates the interval A based on the value of the variance $\sigma^2$. For signals with small noise severity (i.e. with small variance $\sigma^2$), AIESD controller 102 estimates a small value of $\Delta$. For signals with high noise severity (i.e. with large variance $\sigma^2$), AIESD controller 102 estimates a large value of $\Delta$.

Using the interval $\Delta$ calculated by AIESD controller 102, statistical signal processing controller 110 performs a bi-directional search within $P_{width}$ in one embodiment. The number of c(n) values that fall within the interval from $C_{max}$ to $C_{max}-\Delta$ is determined. $I_{low}$ may be determined as the lowest index of a c(n) value that falls within the interval from $c_{max}$ to $c_{max}-\Delta$. $I_{high}$ is determined as the highest index of a c(n) value that falls within the interval from $C_{max}$ to $c_{max}-\Delta$. $I_{low}$ and $I_{high}$ are used to calculate the center of the received pulse signal $I_{mid}$. Calculation of $I_{mid}$ may be performed for one pulse signal in a period, e.g. the pulse signal in period 1. Once $I_{mid}$ is calculated, it may be used as a reference point to divide pulse sequence signal c(n) into $N_{total}$ subgroups with $N_{total}$ equal to the number of periods in the pulse sequence signal. Thus, $N_{total}$ is equal to three. Next, starting at $I_{mid}$ as the reference index (index=1), divide each period in c(n) into $N_T$ samples. Each of the subgroups (corresponding to a period) now has c(1) to $c(N_T)$ values. Thus, the first period may have $c(I_{mid}=1)$ to $c(N_T)$ values, the second period may have $c(N_T+1)$ to $c(2N_T)$ values and the third period may have $c(2N_T+1)$ to $c(3N_T)$ values. Each c(n) value with the same index from each period is added together. Thus, $c(1)=c^1(1)+c^2(1)+c^3(1)$ with $c^1(1)$ first sample in subgroup one, $c^2(1)$ first sample in subgroup two, and $c^3(1)$ first sample in subgroup three. The value of c(1) is divided by $N_{total}$ as described above. Thus, the average values of the samples $\overline{c(n)}$ with the same index in each subgroup are $\overline{c(1)}=c(1)/3$, $\overline{c(2)}=c(2)/3$ . . . $\overline{c(N_T)}=c(N_T)/3$ for our example of $N_{total}$ equal to three periods. The averaged sequence $\overline{c(n)}$ may be used to determine the time delay between the pulse sequence signal and its echo and from the time delay determine the loop length.

Referring back to FIG. 1, statistical signal processing controller 110 may also process the CAZAC sequence signals and echo signals to allow determination of the echo signal using second-order statistics for echo enhancement 111. In another embodiment, echo enhancement technique 111 may receive the average values of the samples $\overline{c(n)}$ described above from the time domain echo averaging technique 112 and then process this data to allow determination of the echo signal amplitude and time index.

As mentioned previously, statistical signal processing controller 110 receives CAZAC sequence signals c(n) from telephone loop 195. CAZAC sequence signal c(n) includes the original signal generated by signal generator 105 and CAZAC sequencer 103 and the echo signals, both represented as s(n). The noise component present in the CAZAC sequence signal may be represented as w(n). Thus, the CAZAC sequence signal c(n) may be represented by the following equation:

$$c(n)=s(n)+w(n)$$

The expected value of a signal E[c(n)] is the long-run average value of that signal. Multiplication of the CAZAC sequence signal c(n) with c(n+k), the CAZAC sequence signal shifted an amount k along the x-axis, will generate a superimposed signal that may be larger or smaller in amplitude based on the original amplitude values of c(n). The expected value of E[c(n)c(n+k)] is also known as the second-order statistics $R_s(k)$ of c(n) and defined as:

$$\begin{aligned} E[c(n)+c(n+k)] &= E[(s(n)+w(n))(s(n+k)+w(n+k)] \quad \text{Equation 5} \\ &= \begin{matrix} E[s(n)+s(n+k)+w(n)s(n+k)+ \\ s(n)w(n+k)+w(n)w(n+k)] \end{matrix}. \end{aligned}$$

When k=0, i.e. the CAZAC sequence signal is multiplied by itself without shifting along x-axis, $$E[c(n)c(n+k)]=E[c(n)c(n)]=R_s(0)+\sigma_w^2.$$

In the above equation, $\sigma_w^2$ is the noise variance. When $k\neq0$, $$E[c(n)c(n+k)]=R_s(k)$$

Here $R_s(k)$ is the auto correlation function of the original CAZAC sequence signal, echo signals, and noise, the components that makeup c(n). $R_s(k)$ may be considered as a measure of the similarity of the waveform c(n) and the waveform c(n+k). Examining Equation 5, the signal s(n) containing the original CAZAC sequence signal and echo signal would have a large similarity to the shifted s(n+k) signal because of its periodic nature. The components of $R_s(k)$ in Equation 5 containing the signal component and noise component w(n) would have a very low measure of similarity as one is a periodic CAZAC sequence signal and the other is a random noise signal. The last component of $R_s(k)$ in Equation 5 w(n)w(n+k) is random noise and because of its randomness and unpredictability, even a small shift k would eliminate any measure of similarity between these two signals. Thus, the impact of the noise w(n) is greatly reduced and an accurate echo measurement may be performed using $R_s(k)$ instead of c(n).

The echo enhancement technique 111 in one embodiment of the invention may be implemented as software executing on statistical signal processing controller 110. In another embodiment, the echo enhancement technique 111 may be implemented for higher performance using digital and analog circuits.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method, comprising:

determining second-order statistics of an echo signal from a first signal of a first length; and ascertaining if the echo signal can be detected from the second-order statistics, and, if so, determining a length of a loop plant communicating the first signal from the echo signal.

2. The method of claim 1, wherein the second-order statistics include an auto correlation of the echo signal.

3. The method of claim 1, further comprising, if the echo signal can be detected from the second-order statistics, determining whether a telephone loop is capable of carrying digital subscriber line loop signals based on the echo signal.

4. The method of claim 3, further comprising determining from a subscriber end of the telephone loop whether the telephone loop is capable of carrying digital subscriber line loop signals.

5. The method of claim 3, further comprising determining from a central office end of the telephone loop whether the telephone loop is capable of carrying digital subscriber line loop signals.

6. The method of claim 1, further comprising:

generating the first signal;

transmitting the first signal to the loop plant, wherein a length of the loop plant is obtained from the echo signal;

generating a second signal of a second length that is greater than the first length if the echo signal cannot be detected from the second-order statistics; and wherein generating the second signal, transmitting the second signal, and determining second-order statistics of an echo signal of the second signal occurs until the echo signal is detected.

7. The method of claim 6, wherein the first signal and the second signal are Constant Amplitude Zero Auto Correlation sequence signals.

8. The method of claim 6, wherein the echo signal includes an amplitude and an occurrence time.

9. The method of claim 8, further comprising:

detecting a received echo signal from a third signal, wherein the third signal is of a length greater then the length of the first or second signal; and verifying that received echo signal from the third signal is of the same amplitude and occurrence time as the echo signal from the first or second signal.

10. A system, comprising:

a sequencer to form a Constant Amplitude Zero Auto Correlation sequence signal; and a controller coupled to said sequencer, said controller to determine a length of the Constant Amplitude Zero Auto Correlation sequence signal to permit detection of a Constant Amplitude Zero Auto Correlation sequence signal echo, said controller to determine a length of a loop plant from the sequence signal echo.

11. The system of claim 10, further comprising:

a signal generator coupled to said sequencer, wherein said signal generator adapts a periodic signal to form the Constant Amplitude Zero Auto Correlation sequence signal, wherein said signal generator transmits the Constant Amplitude Zero Auto Correlation sequence signal to the loop plant; and a measurement scope coupled to said loop plant, wherein said measurement scope is to receive the Constant Amplitude Zero Auto Correlation sequence signal echo.

12. The system of claim 11, further comprising a fuzzy impedance mismatch network coupled to the signal generator; and a statistical signal processing controller coupled to the measurement scope.

13. The system of claim 10, wherein if the Constant Amplitude Zero Auto Correlation sequence signal echo can be detected, the system is to determine whether a telephone loop is capable of carrying digital subscriber line loop signals based on the signal echo.

14. The system of claim 13, wherein the system is to determine from a subscriber end of the telephone loop whether the telephone loop is capable of carrying the digital subscriber line loop signals.

15. The system of claim 13, wherein the system is to determine from a central office end of the telephone loop whether the telephone loop is capable of carrying the digital subscriber line loop signals.

16. An article comprising a storage medium storing instructions readable by a processor-based system that, if executed, enables the processor-based system to:

generate a first signal of a first length;

transmit the first signal to a loop plant;

determine second-order statistics of an echo signal from the first signal, wherein a length of the loop plant is obtained from the echo signal;

ascertain if the echo signal can be detected from the second-order statistics;

generate a second signal of a second length that is greater than the first length if the echo signal cannot be detected from the second-order statistics; and wherein generation of the first signal, transmission, determination, and generation of the second signal is to occur until the echo signal is detected.

17. The article of claim 16, comprising a storage medium storing instructions readable by a processor-based system that, if executed, enables the processor-based system to:

define the second-order statistical calculations to include an auto correlation of the echo signal.

18. The article of claim 16, comprising a storage medium storing instruction readable by a processor-based system that, if executed, enables the processor-based system to:

determine, if the echo signal can be detected from the second-order statistics, whether a telephone loop is capable of carrying digital subscriber line loop signals based on the echo signal.

19. The article of claim 18, comprising a storage medium storing instructions readable by a processor-based system that, if executed, enables the processor-based system to:

determine from a subscriber end of the telephone loop whether the telephone loop is capable of carrying digital subscriber line loop signals.

20. The article of claim 18, comprising a storage medium storing instruction readable by a processor-based system that, if executed, enables the processor-based system to:

determine from a central office end of the telephone loop whether the telephone loop is capable of carrying digital subscriber line loop signals.

21. The article of claim 16, comprising a storage medium storing instructions readable by a processor-based system that, if executed, enables the processor-based system to:

generate the first signal and the second signal as Constant Amplitude Zero Auto-Correlation sequence signals.

22. The article of claim 16, comprising a storage medium storing instructions readable by a processor-based system that, if executed, enables the processor-based system to:

determine an amplitude and an occurrence time of the echo signal.

23. The article of claim 22, comprising a storage medium storing instructions readable by a processor-based system that, if executed, enables the processor-based system to:

detect a received echo signal from a third signal, wherein the third signal is of a lenght greater then the length of the first or second signal; verify that received echo signal from the third signal is of the same amplitude and occurrence time as the echo signal from the first or second signal.

24. A method comprising:

generating a first signal of a first length;

transmitting the first signal to a loop plant;

determining second-order statistics of an echo signal from the first signal;

ascertaining if the echo signal can be detected from the second-order statistics, wherein a length of the loop plant is obtained from the echo signal;

generating a second signal of a second length that is greater than the first length if the echo signal cannot be detected from the second-order statistics; and wherein generating the second signal, transmitting the second signal and determining second-order statistics of an echo signal from the second signal occurs until the echo signal is detected.

25. The method of claim 24, further comprising, if the echo signal can be detected from the second-order statistics, determining whether a telephone loop is capable of carrying digital subscriber line loop signals based on the echo signal.

26. The method of claim 24, further comprising generating the first signal and the second signal via a sequencer and a signal generator.

* * * * *

UNITED STATES PATENT AND TRADEMARK OFFICE

CERTIFICATE OF CORRECTION

PATENT NO. : 7,072,462 B2 Page 1 of 1
APPLICATION NO. : 10/609806
DATED : July 4, 2006
INVENTOR(S) : Wesley H. Smith et al.

It is certified that error appears in the above-identified patent and that said Letters Patent is hereby corrected as shown below:

Column 11:
Line 49, delete "adapts" and insert --is to adapt--;
Line 52, Delete "transmits" and iinsert --is to transmit--.

Signed and Sealed this

Nineteenth Day of September, 2006

JON W. DUDAS
*Director of the United States Patent and Trademark Office*